Patented Apr. 7, 1942

2,278,612

UNITED STATES PATENT OFFICE 2,278,612

METHOD OF MAKING CELLULOSE GLYCOLLIC ACID

William R. Collings, Richard D. Freeman, and Robert C. Anthonisen, Midland, Mich., assignors to The Dow Chemical Company, Midland, Mich., a corporation of Michigan No Drawing. Application March 28, 1941, Serial No. 385,698

4 Claims. (Cl. 260—231)

This invention relates to a method for making cellulose glycollic acid of the type whose alkali metal salts are soluble in water. It relates in particular to a continuous method for making such a cellulose glycollic acid.

Several types of cellulose glycollic acid are recognized. These are classified ordinarily on the basis of solubility characteristics. In general the cellulose glycollic acids heretofore described fall into one of the following four classes: (1) those of a very low degree of substitution which are soluble in 8 per cent aqueous sodium hydroxide only at freezing temperatures, (2) those which are soluble in 8 per cent aqueous sodium hydroxide at, or slightly below, room temperature, (3) those whose sodium salts are soluble in water, (4) those containing 2 or more carbo-methoxy groups per anhydro-glucose unit, which, in the form of free cellulose glycollic acid, are soluble in organic solvents. The present invention is concerned with a method of making cellulose glycollic acid of type 3 defined above.

Prior methods of preparing cellulose glycollic acid of the type whose alkali metal salt is completely soluble in water have all been batch processes and experience has indicated that these prior processes yield products containing substantial quantities of material insoluble in water. No continuous process for making the water-soluble cellulose glycollic acid salt has heretofore been described. There has been disclosed, however, a continuous method for making alkali-soluble cellulose glycollic acid of type 1 defined above. The said process involves, in the stated sequence, the steps of dipping a cellulose sheet into caustic soda solution, pressing the sheet, and then passing the alkali cellulose so-formed into an aqueous solution of sodium chloroacetate. The sheet, on emerging from the chloroacetate bath, is stored until etherification is complete. Such process as that just described does not yield a completely water-soluble cellulose glycollic acid salt. This is probably due to the fact that, as is well known, the cellulose becomes considerably swollen in the alkali bath and the swollen fibers present a somewhat gelatinous surface to the chloroacetic acid solution which cannot completely impregnate the alkali cellulose, and hence, cannot react uniformly therewith.

It is an object of the present invention to provide a continuous method for the production of water-soluble alkali metal cellulose glycollate. Another object is to provide a simple process for the etherification of cellulose with chloroacetic acid or related compounds to yield water-soluble alkali metal cellulose glycollate substantially free from water-insoluble material. These and related objects are attained in the manner hereinafter described.

According to the invention cellulose, preferably in continuous sheet form, is passed into, through, and out of a solution of chloroacetic compound selected from the group consisting of chloroacetic acid and its water-soluble salts, pressing the so-impregnated sheet to remove the excess chloroacetic acid solution, passing the chloroacetate-containing cellulose through an aqueous alkali metal hydroxide solution and finally allowing the so-impregnated sheet to stand for from 2 to 6 hours, with or without shredding, at a temperature between 0° and 80° C. and preferably below 40° C. Among the specific water-soluble chloroacetic compounds which may be used for the purpose are chloroacetic acid and sodium chloroacetate. This method results in the formation of a cellulose glycollic acid in the form of its sodium salt, which is directly and completely soluble in water at room temperature.

In a preferred manner of carrying out the invention, the steps of impregnating with a chloroacetic compound, pressing, and impregnating with an alkali metal hydroxide solution, with or without a final pressing, are carried out in the order specified and under conditions such that the final impregnated cellulose sheet contains from 2 to 5 parts by weight of a combination of the chloroacetic compound, the alkali metal hydroxide, and the water, per part of cellulose. More specifically, the steps are carried out in a manner so as to yield a final impregnated sheet containing from 17 to 33 per cent of cellulose, from 27 to 54 per cent of water, from 10 to 30 per cent of sodium hydroxide, and from 6.7 to 25 per cent of the chloroacetic compound calculated as chloroacetic acid. The amount of water present in the sheet as reported above is computed to include that which is formed by neutralization of the chloroacetic acid by the alkali metal hydroxide in those cases where the chloroacetic compound is the free acid itself. Similarly, when chloroacetic acid is the chloroacetic compound, the amount of alkali present in the impregnated sheet, as above reported, is computed as the amount of alkali absorbed by the sheet in excess over the amount required to neutralize the chloroacetic acid. It is observed from the analysis given that the water-soluble alkali metal hydroxide and chloroacetic acid, which together may be considered to constitute the active impregnants, bear to one another a relative weight ratio such that, in the mixture of total impregnants, including water, there is from 40 to 65 per cent of alkali metal hydroxide and from 10 to 30 per cent of chloroacetic compound calculated as chloroacetic acid.

The aforementioned quantities of chloroacetic acid may be introduced into the cellulose sheet by passing the said sheet through a chloroacetic acid solution of from 30 to 80 per cent concentration and subsequently pressing the sheet to remove any excess chloroacetic acid over the amount desired. Optimum ratios are obtained by the use of chloroacetic solutions of from 50 to 75 per cent concentration. It has been found, as a convenient working criterion, that the desired ratios and the specified final composition will be obtained if the amount of chloroacetic solution left in the cellulose after pressing is about equal to the weight of the cellulose itself.

The concentration of the alkali metal hydroxide solution employed may vary between 30 and 55 per cent. Solutions of much higher concentration than 55 per cent should not ordinarily be employed, as these require elevated temperatures in order to remain in the liquid state and such temperatures have been found to reduce materially the yield of the desired cellulose glycollic acid. Alkali solutions of below 30 per cent concentration are relatively ineffective, in that the rate of reaction is materially lowered, and it becomes increasingly difficult with such dilute solutions to keep within the cellulose sheet the proper ratio of impregnants and not to exceed the upper limit of permissible amount of water. Of the alkali metal hydroxides, any of which may be used including potassium or lithium hydroxides, it is preferred to use sodium hydroxide. The source and nature of the cellulose sheet is of minor importance, though it is preferred, in the interests of uniformity, to employ the so-called "chemical pulps" which are commercially available, specially purified pulps of high alpha-cellulose content derived either from wood or cotton linters.

The following examples illustrate the practice of the invention:

Example 1

A sheet of cotton linters 0.019 inch thick and 6 inches wide was unwound from a supply roll and passed through a bath consisting of a 75 per cent aqueous solution of chloroacetic acid. The length of the path traversed by the sheet through the solution and the rate of passage were adjusted so that the cellulose was immersed in the bath for 5 seconds. The emerging sheet was squeezed between rubber coated rollers so as to leave in the sheet 0.71 part by weight of chloroacetic acid and, correspondingly, 0.24 part of water per part of cellulose. The so-treated sheet was passed through a solution of caustic soda of 41.3 per cent concentration. The rate of travel of the sheet remained the same as before and the path which it traversed through the alkali bath was 3 times as long as that in the chloroacetic bath, the period of immersion in the alkali bath being 15 seconds. The still traveling sheet, on emergence from the alkali bath, was pressed lightly by being passed between a pair of rubber covered rollers set 0.033 inch apart. These latter rollers served primarily to wipe excess caustic soda solution from the surface of the cellulose sheet. The resulting uniformly impregnated sheet contained 0.983 part by weight of caustic soda per part of cellulose in excess over that required to react with the chloroacetic acid present in the sheet. The amount of water in the final impregnated sheet, including that formed through neutralization of the chloroacetic acid, was 2.2 parts by weight per part of cellulose. The sheet was shredded and the so-formed product transferred from the shredder to a slow moving belt on which it reposed for 4 hours at 25° C. while the etherification reaction progressed. At the end of 4 hours the reaction mass was mixed with water and the excess caustic soda present was neutralized by the careful addition of an equivalent amount of dilute hydrochloric acid. The sodium cellulose glycollate formed remained dissolved in the neutral solution. In order to purify the sodium cellulose glycollate it was precipitated from the neutral aqueous solution by the addition thereto of 95 per cent alcohol and was freed from salts and other soluble impurities by washing the precipitate with a 60 per cent aqueous solution of ethyl alcohol. The product then was found to be soluble in water at room temperature to the extent of 98.7 per cent. The average degree of etherification of the product obtained was 0.51 carbo-methoxy group per anhydro-glucose unit.

Example 2

In a manner similar to that described in the preceding example several batches of sodium cellulose glycollate were prepared. The pertinent reaction conditions and the properties of the product obtained are given in the following table:

*Table*

| No. | Impregnants | | | | | Reaction time | Product | |
|---|---|---|---|---|---|---|---|---|
| | Solution concentration | | Parts by weight per part of cellulose in impregnated sheet | | | | Solubility in water | Degree of substitution |
| | NaOH | CH₂ClCOOH | NaOH | CH₂ClCOONa (calc. as CH₂ClCOOH) | H₂O | | | |
| | *Percent* | *Percent* | | | | *Hours* | | |
| 1 | 50 | 40 | 1.07 | 0.793 | 2.70 | 5 | 97.6 | 0.44 |
| 2 | 41.2 | 75 | 0.965 | 0.768 | 2.22 | 5 | 100.0 | 0.55 |
| 3 | 50 | 75 | 1.00 | 0.772 | 1.86 | 5 | 99.8 | 0.51 |
| 4 | 37.3 | 75 | .959 | 0.776 | 2.57 | 6 | 100.0 | 0.49 |
| 5 | 40.7 | 75.3 | 1.08 | 0.986 | 2.69 | 6 | 97.4 | 0.58 |
| 6 | 50.0 | 75.4 | 1.02 | 0.788 | 1.77 | 6 | 99.8 | 0.67 |
| 7 | 41.2 | 75 | .983 | 0.706 | 2.18 | 6 | 98.7 | 0.51 |
| 8 | 50.0 | 75.2 | 1.14 | 0.772 | 1.87 | 6 | 99.8 | 0.51 |
| 9 | 50.6 | 75 | 1.07 | 0.750 | 1.73 | 6 | 100.0 | 0.59 |

In each instance the etherification was carried out for the time specified and at the prevailing room temperature, which in some of the runs was near 20° and in all of the runs was below 30° C.

For comparison with the results obtained according to the herein claimed process, a run was made in which a cellulose sheet was first impregnated with caustic soda solution and then was dipped in the chloroacetic acid solution. Other conditions were similar to those cited in Example 1; the specific amounts of impregnants in the cellulose sheet before the etherification reaction occurred were approximately the same as those reported for run No. 3 in the table in Example 2. The caustic soda solution employed was of 50 per cent strength, and immersion time therein was 5 seconds. The etherified product, obtained after 6 hours at 25° C., was only 85 per cent soluble in water. It was observed that, when the cellulose was dipped in the caustic solution before being dipped in the chloroacetic acid solution, much less swelling of the cellulose sheet occurred than when the steps were carried out in the order here claimed. Specifically, the cellulose sheet employed in the comparative test, which was 0.02 inch thick before treatment, swelled to a thickness of 0.057 inch when subjected to the successive tests of dipping in caustic soda, squeezing, and dipping in chloroacetic acid, while a similar sheet first impregnated with chloroacetic acid, then squeezed in the manner described, and dipped in caustic soda solution, swelled to a final thickness of 0.085 inch.

The invention has been illustrated with respect to the use of chloroacetic acid as the preferred chloroacetic compound. Other water-soluble chloroacetic compounds may be employed. The reactions reported in the preceding examples were carried out at room temperature. Other temperatures may be employed, but it is preferred to maintain the temperature of the impregnated cellulose below 40° C. throughout the reaction period to minimize degradation and by-product formation.

We claim:

1. The method which comprises first impregnating cellulose with a water solution of from 30 to 80 per cent concentration of a chloroacetic compound selected from the group consisting of chloroacetic acid and the water-soluble salts thereof, and impregnating the so-treated cellulose with an alkali metal hydroxide solution of from 30 to 55 per cent concentration, under conditions such as to provide, in the mass, a composition consisting of from 17 to 33 per cent of cellulose; from 27 to 54 per cent of water, including that which may be formed by reaction between the chloroacetic compound and the alkali metal hydroxide; from 10 to 30 per cent of the alkali metal hydroxide, in excess over that which may react with the chloroacetic compound; and from 6.7 to 25 per cent of the chloroacetic compound, calculated as chloroacetic acid; and allowing the said composition to react at a temperature between about 0° and about 80° C. to produce an alkali metal salt of cellulose glycollic acid which is substantially completely soluble in water at room temperature.

2. The method which comprises first impregnating cellulose with a water solution of from 50 to 75 per cent concentration of a chloroacetic compound selected from the group consisting of chloroacetic acid and the water-soluble salts thereof, and impregnating the so-treated cellulose with an alkali metal hydroxide solution of from 30 to 55 per cent concentration, under conditions such as to provide in the mass a composition consisting of from 17 to 33 per cent of cellulose; from 27 to 54 per cent of water, including that which may be formed by reaction between the chloroacetic compound and the alkali metal hydroxide; from 10 to 30 per cent of the alkali metal hydroxide in excess over that which may react with the chloroacetic compound, and from 6.7 to 25 per cent of the chloroacetic compound, calculated as chloroacetic acid; and allowing the said composition to react at a temperature between about room temperature and about 40° C. to produce an alkali metal salt of cellulose glycollic acid which is substantially completely soluble in water at room temperature.

3. The method which comprises first impregnating cellulose with a water solution of from 50 to 75 per cent concentration of chloroacetic acid, and impregnating the so-treated cellulose with sodium hydroxide of from 30 to 55 per cent concentration, under conditions such as to provide, in the mass, a composition consisting of from 17 to 33 per cent of cellulose; from 27 to 54 per cent of water, including that which may be formed by reaction between the chloroacetic acid and the sodium hydroxide; from 10 to 30 per cent of the sodium hydroxide, in excess over that which may react with the chloroacetic acid; and from 6.7 to 25 per cent of the chloroacetic acid; and allowing the said composition to react at a temperature between about room temperature and about 40° C. to produce a sodium salt of cellulose glycollic acid which is substantially completely soluble in water at room temperature.

4. The method which comprises first impregnating cellulose with a water solution of from 50 to 75 per cent concentration of chloroacetic acid, in amount approximately equal to the weight of cellulose, and impregnating the so-treated cellulose with sodium hydroxide of from 30 to 55 per cent concentration, under conditions such as to provide, in the mass, a composition consisting of from 17 to 33 per cent of cellulose; from 27 to 54 per cent of water, including that which may be formed by reaction between the chloroacetic acid and the sodium hydroxide; from 10 to 30 per cent of the sodium hydroxide, in excess over that which may react with the chloroacetic acid; and from 6.7 to 25 per cent of the chloroacetic acid; and allowing the said composition to react at a temperature between about room temperature and about 40° C. to produce a sodium salt of cellulose glycollic acid which is substantially completely soluble in water at room temperature.

WILLIAM R. COLLINGS.
RICHARD D. FREEMAN.
ROBERT C. ANTHONISEN.